United States Patent [19]

Patterson, III et al.

[11] 4,161,145
[45] Jul. 17, 1979

[54] ADJUSTABLE BULKHEAD ASSEMBLY

[76] Inventors: William W. Patterson, III; Eugene F. Grapes, both c/o W. W. Patterson & Company, 830 Brocket St., Pittsburgh, Pa. 15233

[21] Appl. No.: 812,252

[22] Filed: Jul. 1, 1977

Related U.S. Application Data

[63] Continuation-in-part of Ser. No. 618,807, Oct. 2, 1975, Pat. No. 4,062,520, which is a continuation-in-part of Ser. No. 399,826, Sep. 24, 1973, Pat. No. 3,934,855.

[51] Int. Cl.² .................... B60P 7/14; B60P 7/16; B61D 45/00; B65G 1/14
[52] U.S. Cl. .................. 105/376; 105/467; 105/478; 105/489; 105/495; 105/498
[58] Field of Search ............... 105/376, 466, 467, 468, 105/486, 487, 488, 489, 490, 491, 493, 494, 495, 496, 497, 498, 502, 503, 478; 214/10.5 R, 152; 248/59; 254/73, 79, 105, 135 R, 161, 164, 191

[56] References Cited

U.S. PATENT DOCUMENTS

| 681,291 | 8/1901 | Angle | 254/161 |
|---|---|---|---|
| 1,185,194 | 5/1916 | Gorman | 254/164 |
| 1,239,061 | 9/1917 | Tangen | 254/161 X |
| 1,318,078 | 10/1919 | Hettinger | 254/161 |
| 1,606,288 | 11/1926 | Bennett | 248/59 |
| 1,721,563 | 7/1929 | Kupelian | 105/489 |
| 1,920,686 | 8/1933 | Faure | 254/135 R |
| 2,160,870 | 6/1939 | Jones | 105/376 |
| 2,335,516 | 11/1943 | Koonce | 214/152 |
| 2,363,138 | 11/1944 | Moore | 254/164 |
| 2,523,869 | 9/1950 | Fleming | 248/59 |
| 2,606,670 | 8/1952 | Weaver | 214/10.5 R |
| 2,669,402 | 2/1954 | Del Mar | 105/376 X |
| 2,720,849 | 10/1955 | Prati | 105/494 |
| 2,854,931 | 10/1958 | Campbell | 105/467 |
| 2,955,560 | 10/1960 | Howington et al. | 254/191 |
| 3,072,270 | 1/1963 | Tolby et al. | 105/468 |
| 3,099,313 | 7/1963 | Peck et al. | 105/376 X |
| 3,192,879 | 7/1965 | Pier | 105/491 |
| 3,280,760 | 10/1966 | Woods et al. | 105/376 |
| 3,323,569 | 6/1967 | Bylo | 214/10.5 R X |
| 3,348,812 | 10/1967 | Story | 254/161 |
| 3,395,892 | 8/1968 | Ratclif | 254/79 |
| 3,410,525 | 11/1968 | Tanson | 254/105 |
| 3,437,222 | 4/1969 | Sause, Jr. | 214/152 |
| 3,465,692 | 9/1969 | Hyatt | 105/502 |
| 3,637,094 | 1/1972 | Gray | 214/10.5 R |
| 3,788,498 | 1/1974 | Slusher | 214/10.5 R |
| 3,799,503 | 3/1974 | Desplats | 254/73 |
| 3,850,295 | 11/1974 | Black | 214/10.5 R X |
| 3,934,855 | 1/1976 | Patterson et al. | 254/135 R |
| 4,062,520 | 12/1977 | Patterson et al. | 254/161 |
| 4,082,044 | 4/1978 | Day | 105/376 |

Primary Examiner—Francis S. Husar
Assistant Examiner—Howard Beltran
Attorney, Agent, or Firm—Buell, Blenko & Zeisenheim

[57] ABSTRACT

A movable bulkhead or cargo restraint assembly is provided for cargo space such as a railway car, truck bed, boat hold or the like in the form of a plurality of spaced apart elongated strands fixed at one end to a confining wall of a cargo space, said strands being spaced apart around a cargo to be restrained, bulkhead device movable on said elongated strands lengthwise thereof to contact the cargo to be restrained, and a clamp device adjustable on each strand bearing against said bulkhead device engaging said strand to restrain said bulkhead against movement away from the cargo and releasing the strand on movement in the opposite direction whereby said clamp is adjusted to tightly hold the bulkhead device against said cargo.

10 Claims, 8 Drawing Figures

ADJUSTABLE BULKHEAD ASSEMBLY

This application is a continuation-in-part of our copending application Ser. No. 618,807, filed Oct. 2, 1975, now U.S. Pat. No. 4,062,520, issued Dec. 3, 1977 which was in turn a continuation-in-part of our then copending application Ser. No. 399,826, filed Sept. 24, 1973, now U.S. Pat. No. 3,934,855 issued Jan. 27, 1976.

This invention relates to adjustable bulkheads utilizing clamps for wire rope, rods and tubes and particularly to adjustable bulkheads utilizing a quickly adjustable clamp capable of either pulling or pushing to bind or hold a load.

Adjustable bulkheads for use in railway cars, trucks, etc., have been proposed. Basically these prior art devices have depended upon fixed rails or clips on the sidewalls of the vehicle as for example, the movable bulkhead of U.S. Pat. No. 3,850,295.

Such prior art devices do not permit intermediate adjustment to adjust the bulkhead to maintain the load tightly placed.

We provide several embodiments of adjustable bulkhead apparatus including a preferred embodiment of apparatus, in which a slack take-up device functions cooperatively with the body of each clamp device, at selected points on an adjustable bulkhead member. In a preferred embodiment we provide a floating screw and nut assembly detachably secured to the body of a wire rope clamp which bears on the adjustable bulkhead member. The clamp means is preferably engageable on a cable rod or tube on movement in one direction and releasable from said cable rod or tube on movement in the opposite direction.

In the foregoing general outline of our invention we have set out certain objects, purposes and advantages of our invention. Other objects, purposes and advantages will be apparent from a consideration of the following description and accompanying drawings in which.

Figure 1:
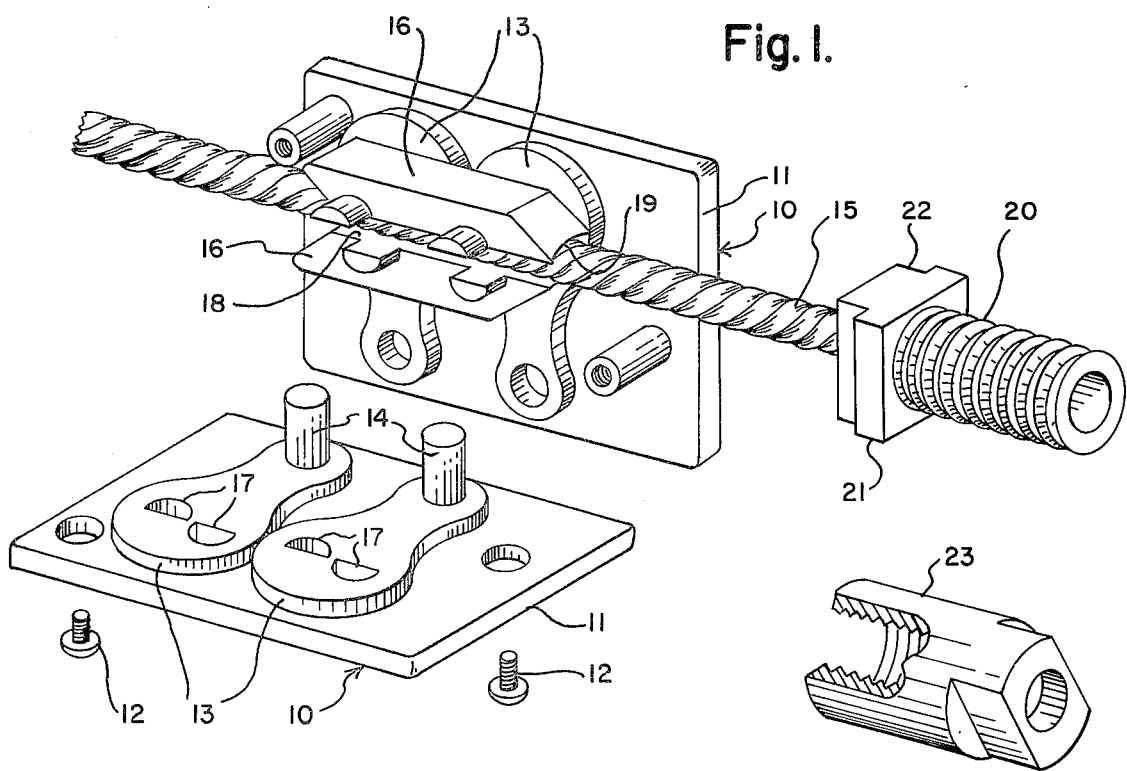
FIG. 1 is an exploded section view through a binder clamp and floating screw and nut used in this invention.

Referring to the drawings we have illustrated in FIG. 1 a load clamp 10 having a body 11 in generally rectangular form. The cover for one side is removed but is normally held in position by a plurality of screws 12. Within the body 11 are a pair of generally parallel arms 13, each pivotally mounted at one end in the body on pins 14. The arms 13 are bifurcated and straddle a strand 15 extending through the body. The strand 15 may be a tubular member, a rod, a wire rope or the like. The strand 15 enters the body 10 at one end and passes between semi-cylindrical elements 16 disposed in staggered transverse semi-circular openings 17 in the arms 13. The flat faces 18 of cylindrical elements 16 contain curved recesses 19 conforming to the cross section of strand 15. A floating hollow screw 20 having a head 21 with lands 22 adapted to rest between and bear on frame 10 is provided around strand 15. A nut 23 is threaded on the screw 20.

Figure 2:
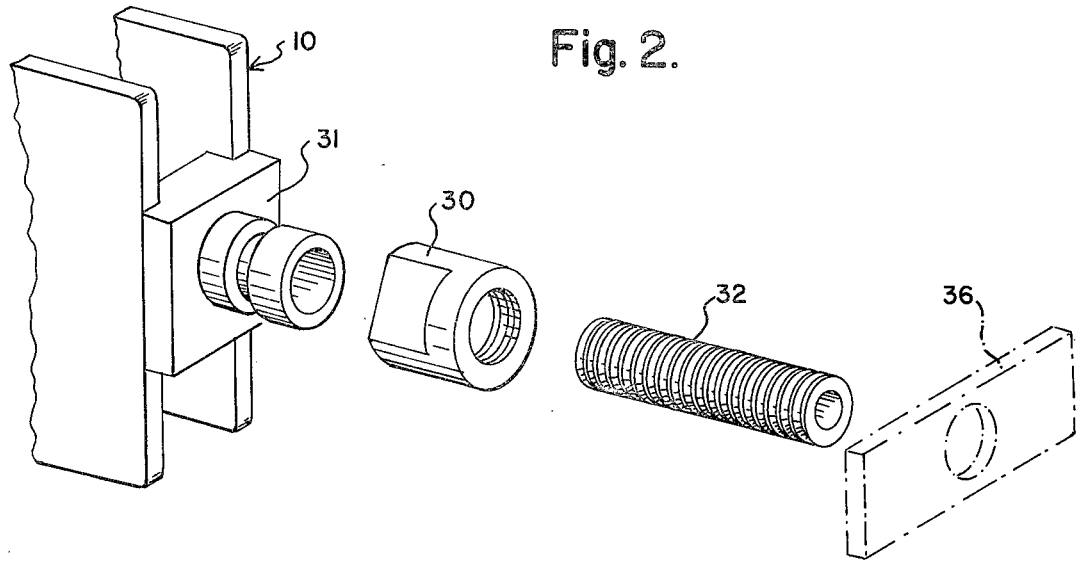
FIG. 2 is a second embodiment of binder and floating screw and nut.

In the modification shown in FIG. 2 a nut 30 rotatably keyed on fixed head 31 and having a hollow screw 32 threaded therein is substituted for the floating hollow screw 20 of FIG. 1.

Figure 3:
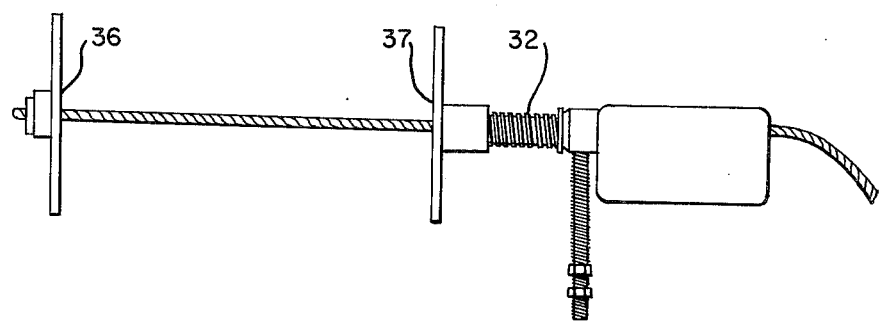
FIG. 3 is a side elevational view of the load binder clamp of this invention assembled for restraining or compressing a load.

In FIG. 3 we have illustrated the clamp of FIG. 2 used in conjunction with a wire rope 35 having a plate 36 at one end. A plate 37 is rotatably mounted on the screw 32. This arrangement is used to restrain or compress a load between plates 36 and 37.

Figure 4:
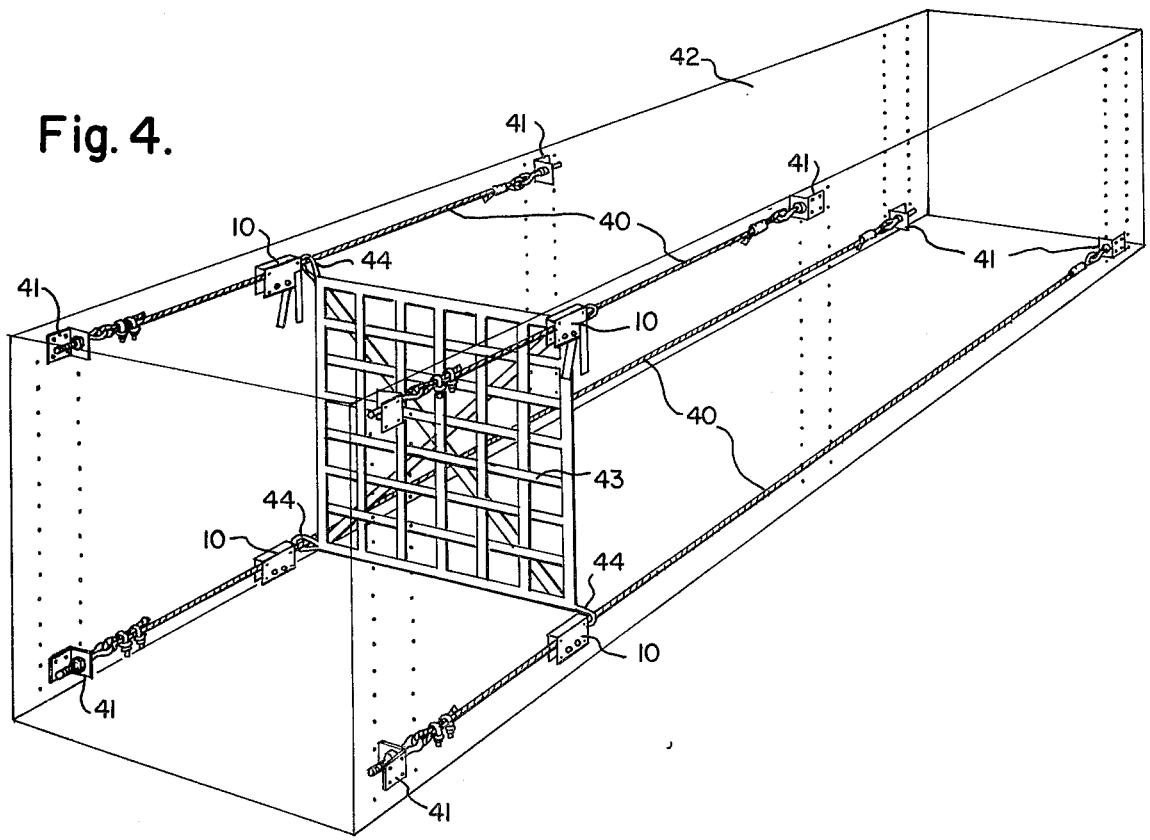
FIG. 4 is a side elevational view of one embodiment of the movable bulkhead or cargo restraint of this invention, assembled for binding and tensioning a load.

In FIG. 4 we have illustrated one form of movable bulkhead or cargo restraint assembly according to this invention. In this embodiment four cables 40 are fixed at opposite ends to angle clips 41 at each end of a cargo space such as a truck body 42. A load clamp 10, such as shown in FIG. 1 is placed on each cable 40 and a cargo web 43 with clips 44 is fitted on cables 40. When the cargo space 42 is partially filled, the cargo web 43 is moved into place against the cargo and clamps are moved along cables 40 into engagement with clips 44 and nut 23 is turned to tighten the web.

Figure 5:
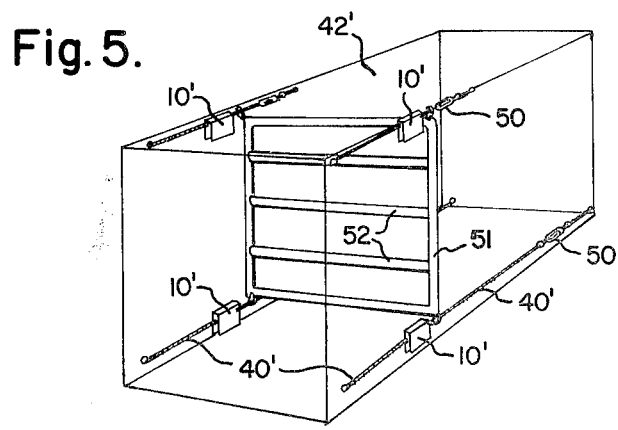
FIG. 5 is a side elevational view of a second embodiment of the movable bulkhead or cargo restraint assembly of this invention.

In FIG. 5, we have illustrated a second embodiment of our invention which is essentially the same as that of FIG. 4 with like parts bearing like numbers with a prime suffix. The two embodiments differ in that the cables 40' are provided with turnbuckles 50 intermediate their ends for maintaining the cables taut. In addition the cargo restraint member is a square rigid frame 51 with shoring bars 52 extending horizontally across the frame.

Figure 6:
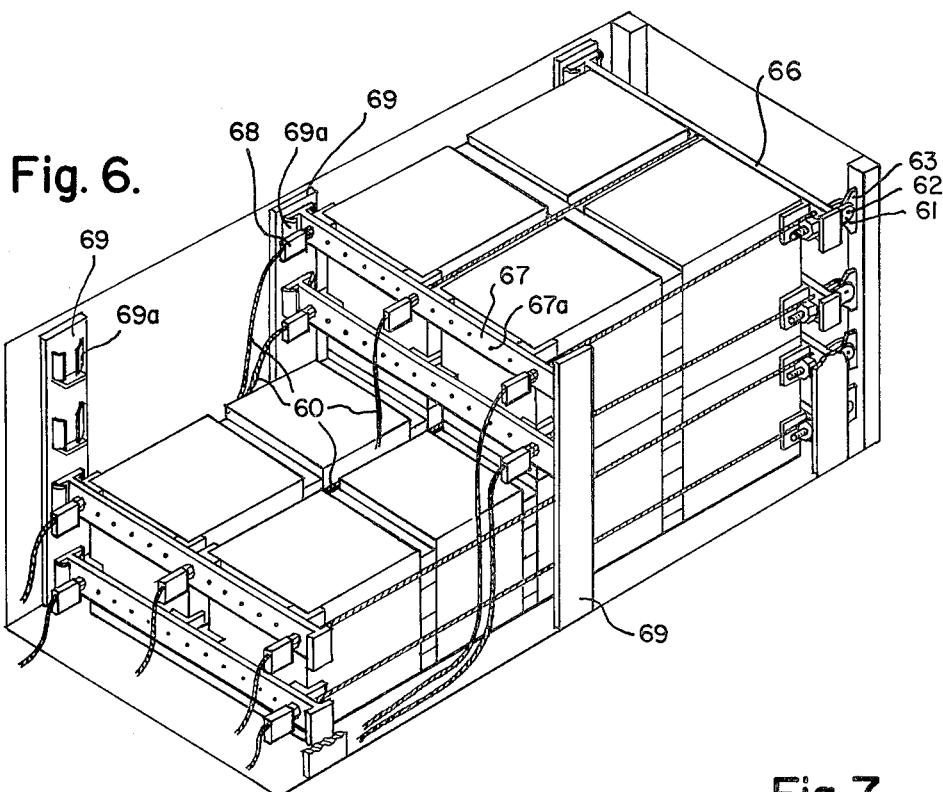
FIG. 6 is a side elevational view of a third embodiment of movable bulkhead or cargo restraint assembly of this invention.
Figure 7:
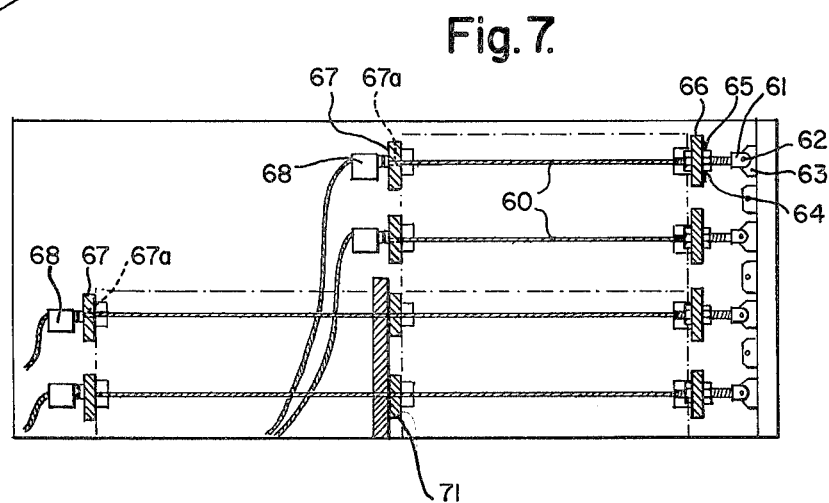
FIG. 7 is a longitudinal section of the embodiment of this invention illustrated in FIG. 6.

In the embodiment of FIGS. 6 and 7 we have illustrated a form of cargo restraint system which is particularly useful for handling fragile or sensitive loads such as explosives, ammunition and the like. In this embodiment a plurality of cables 60 are arranged vertically and horizontally in the cargo space. One end of each cable 60 is fixed to a cross member 66 mounted at each end on a clevis head 61 which is attached by pin 62 to anchor plates 63 on the end wall of the cargo space. Spaced from each clevis head 61 is a thimble or stop member 64 against which bears a washer 65 abutting cross member 66 designed to space the load away from the end wall of the cargo space. The same effect can be obtained by using an elongated threaded shaft carrying a retaining nut on the clevis to bear against washer 65 and cross member 66. The opposite ends of cables 60 pass through openings 67a in rear cross members 67 and through wire clamps 68 which may be of the form shown in FIGS. 1-3. A movable vertical bearing post 69 having U-shaped receptacles 69a for receiving the ends of the cross members is preferably provided at each end of the cross members. In addition to the front cross members 66 and rear cross members 67, we may also provide intermediate cross members 71. The cross members are, in all cases, preferably the same size and shape and are interchangeable.

Figure 8:
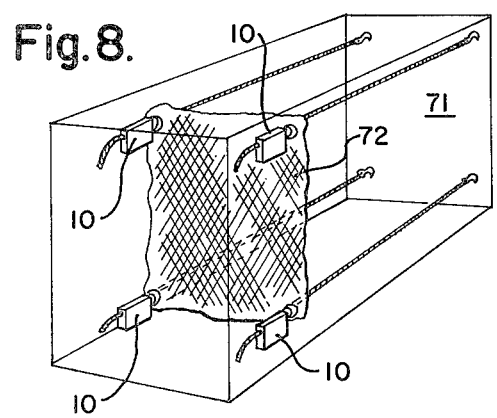
FIG. 8 is a side elevational view of a fourth embodiment of movable bulkhead or cargo restraint system of this invention.

In FIG. 8 we have shown four clamps 10 and cables 70 attached to four corners of two spaced plates 71 and 72. The cables 70 are drawn through clamps 10 until tight with a load between plates 71 and 72 and nut 23 turned on screw 20 to accomplish final tightening. Instead of a plate 72, we may use a mesh closure made of wire rope mesh, etc.

As can be seen from the foregoing specification this invention can be used in a variety of ways and in a variety of combinations to produce pulling, pushing, clamping and the like forces. Accordingly it will be understood that the invention may take various forms within the scope of the following claims.

We claim:

1. A movable bulkhead and cargo restraint assembly comprising a plurality of spaced apart elongated strands fixed at one end to a confining wall of a cargo space, said strands being spaced apart around a cargo to be restrained, bulkhead means movable on said elongated strands lengthwise thereof on the side of the cargo opposite said one end to contact the cargo to be restrained, and an independent movable clamp means independently adjustable on each strand bearing against said bulkhead means opposite the cargo automatically engaging said strand when taut to restrain said bulkhead against movement away from the cargo and said clamp means automatically releasing the strand on movement in the opposite direction toward said cargo whereby said clamp means is adjusted to tightly hold the bulkhead means against said cargo.

2. A movable bulkhead and cargo restraint assembly as claimed in claim 1 wherein the movable bulkhead means is a nylon net having clips engaged around said strands.

3. A movable bulkhead and cargo restraint assembly as claimed in claim 1 wherein said clamp means comprises a housing, means in said housing engaging said strand on movement of said strand through said housing in one direction and releasing the same on movement in the opposite direction, a hollow screw adapted removably to bear on the housing and surround said strand at either side of said housing and nut means acting on said hollow screw, one of said nut and screw acting on said movable bulkhead to adjust the bulkhead with respect to said load.

4. A movable bulkhead and cargo restraint assembly as claimed in claim 1 wherein a forward bulkhead means is fixed on said strands spaced from the said confining wall of said cargo space.

5. A movable bulkhead and cargo restraint assembly as claimed in claim 1 wherein the movable bulkhead means is a rectangular frame and the plurality of strands are four wire cables passing through the corners thereof.

6. A movable bulkhead and cargo restraint assembly as claimed in claim 5 wherein said rectangular frame is provided with a plurality of shoring bars extending from one side to the other of said frame.

7. A movable bulkhead and cargo restraint assembly as claimed in claim 1 wherein the movable bulkhead means is at least one horizontal bar slidable on at least a pair of spaced apart parallel cables.

8. A movable bulkhead and cargo restraint assembly as claimed in claim 7 having at least two spaced apart horizontal bars, each slidable on a pair of spaced apart parallel cables.

9. A movable bulkhead and cargo restraint assembly as claimed in claim 8 wherein the ends of each horizontal bar are removably engaged in a vertical carrier member.

10. A movable bulkhead and cargo restraint assembly as claimed in claim 9 wherein the clamp means comprises a housing, means in said housing engaging said cables on movement of said cables through said housing in one direction and releasing the same on movement in the opposite direction, a hollow screw adapted removably to bear on the housing and surround said cable at either side of said housing and nut means acting on said hollow screw, one of said nut and screw acting on said movable bulkhead to adjust the bulkhead with respect to said load.

* * * * *